(12) United States Patent
Maack

(10) Patent No.: US 9,213,136 B2
(45) Date of Patent: Dec. 15, 2015

(54) SPLICING AND CONNECTORIZATION OF PHOTONIC CRYSTAL FIBERS

(75) Inventor: Martin Dybendal Maack, Kgs. Lyngby (DK)

(73) Assignee: NKT PHOTONICS A/S, Birkerod (DK)

( * ) Notice: Subject to any disclaimer, the term of this patent is extended or adjusted under 35 U.S.C. 154(b) by 617 days.

(21) Appl. No.: 13/389,920

(22) PCT Filed: Aug. 16, 2010

(86) PCT No.: PCT/DK2010/050211
§ 371 (c)(1),
(2), (4) Date: Apr. 19, 2012

(87) PCT Pub. No.: WO2011/018094
PCT Pub. Date: Feb. 17, 2011

(65) Prior Publication Data
US 2012/0195554 A1    Aug. 2, 2012

(30) Foreign Application Priority Data

Aug. 14, 2009  (DK) .................................. 2009 00934

(51) Int. Cl.
G02B 6/02        (2006.01)
G02B 6/032       (2006.01)
G02B 6/255       (2006.01)

(52) U.S. Cl.
CPC .......... *G02B 6/02357* (2013.01); *G02B 6/2552* (2013.01); *G02B 6/02347* (2013.01)

(58) Field of Classification Search
CPC .................................................. G02B 6/02357
See application file for complete search history.

(56) References Cited

U.S. PATENT DOCUMENTS

| 2002/0114574 A1 | 8/2002 | Chandalia et al. |
| 2006/0067632 A1 | 3/2006 | Broeng et al. |
| 2007/0122095 A1* | 5/2007 | Broeng et al. ............... 385/125 |

FOREIGN PATENT DOCUMENTS

| CN | 1504784 A | 6/2004 |
| CN | 1535389 A | 10/2004 |
| EP | 1 199 582 A1 | 4/2002 |
| EP | 1 426 795 A2 | 6/2004 |
| JP | 2005-301024 A | 10/2005 |

(Continued)

OTHER PUBLICATIONS

Bjarklev et al., "Photonic Crystal Fibres" Kluwer Academic Publishers, (2003), ISBN: 1-4020-7610-X, pp. 115-130.

(Continued)

*Primary Examiner* — Michelle R Connelly
(74) *Attorney, Agent, or Firm* — Buchanan Ingersoll & Rooney

(57) ABSTRACT

The present invention relates to an optical fiber comprising at least a first end with an first end facet, the optical fiber comprising a core region capable of guiding light at a first wavelength λ; and a microstructured cladding region surrounding said core region. The cladding region comprises an inner cladding region and an outer cladding region. The inner cladding region comprises inner cladding features arranged in an inner cladding background material having a refractive index $n_1$, said inner cladding features comprising thermally collapsible holes or voids. The outer cladding region comprising outer cladding features arranged in an outer cladding background material, said outer cladding features comprising solid material with refractive index $n_2$, wherein $n_2$ is lower than $n_1$. The invention further relates to methods for splicing such an optical fiber to an optical component and to methods for using such an optical fiber.

26 Claims, 8 Drawing Sheets

(56) References Cited

FOREIGN PATENT DOCUMENTS

| WO | WO 00/49435 A1 | 8/2000 |
| WO | 0198819 A2 | 12/2001 |
| WO | 02084350 A1 | 10/2002 |
| WO | WO 2004/049025 A1 | 6/2004 |

OTHER PUBLICATIONS

Broeng et al. "Invited Paper, Photonic Crystal Fibers: A New Class of Optical Waveguides" Optical Fiber Technology, (1999), vol. 5, pp. 305-330.

Hansen et al., Highly Nonlinear Photonic Crystal Fiber with Zero-Dispersion at 1.55 μm Optical Fiber Communication Conference (OFC) Postdeadline Papers, Mar. 17, 2002, pp. FA9-1-FA9-3.

Joannopoulos et al., "Photonic Crystal, Molding the Flow of Light" Princeton University 10 Press, (1995), 99. 126-129.

International Search Report dated Nov. 19, 2010, issued in the corresponding International Application No. PCT/DK2010/050211. (2 pages).

Extended European Search Report dated Jun. 3, 2013, issued by European Patent Office in corresponding European Patent Application No. 10808002.9 (7 pgs.).

\* cited by examiner

SPLICING AND CONNECTORIZATION OF PHOTONIC CRYSTAL FIBERS

The present invention relates to a method of coupling an optical fiber to an optical component; an optical fiber; a preform for producing an optical fiber; a method of producing an optical fiber comprising drawing of the preform; a heat-treated optical fiber; an article comprising an optical fiber.

In recent years a new class of optical fibers has appeared. The optical guiding mechanism in these fibers is provided by introducing a number of holes or voids in the optical fibers. These holes typically run parallel with the fiber and extend along the fiber length. Such fibers are generally described by A. Bjarklev et al. in "Photonic Crystal Fibers", Kluwer Academic Publishers, 2003 (ISBN 1-4020-7610-X), which is referred to in the following as [Bjarklev et al.]).

The light guiding principle can be based on Total Internal Reflection (TIR) similar to the guiding principle of traditional optical fibers (non-microstructured optical fibers, also termed 'standard optical fibers' in the following), which do not comprise such holes, or it can be based on the Photonic Band Gap (PBG) principle.

For TIR-based optical fibers, where the core is surrounded by a cladding region comprising holes, such as a number of closely spaced holes, the core may comprise a solid glass region, which has a larger refractive index than the effective refractive index of the cladding region.

For PBG-based optical fibers, the core is not limited to a solid material. It can be a hole, or a combination of a solid background material and holes, surrounded by a cladding region comprising a Photonic Band Gap. The refractive index of the core can take values down to that of air, since light guiding along the optical fiber is given by the fact that light cannot propagate through the cladding region. Consequently, light is confined within the core. The cladding region may comprise a cladding material and carefully arranged air holes of predetermined hole size, distance and pattern.

In general, the holes or voids can be any so-called feature comprising a material having a refractive index different from that of the background material. The so-called features may also comprise a material having a refractive index different above that of the background material. The holes or voids may comprise a solid material, a gas, a liquid or a vacuum.

The air holes, or features, in the cladding may influence the optical properties of the optical fibers. In some fiber designs, the influence from the air holes dominates the influence from other factors in relation to the optical properties of the optical fibers. In general, these types of optical fibers will in the following be called photonic crystal fibers (PCFs). Optical fibers of this type are also known as microstructured fibers, holey fibers, photonic band gap fibers, hole-assisted optical fibers, as well as other names may be used.

PCFs may have characteristics quite different from conventional, solid glass optical fibers and thus find applications in a range of different fields.

Transition from small core PCFs to standard optical fibers is generally difficult. Splice losses are typically high (≥0.3 dB—see e.g. Hansen et al., "Highly Nonlinear Photonic Crystal Fiber with Zero-Dispersion at 1.55 μm" Optical Fiber Communication Conference 2002 post deadline paper, 2002), and the mechanical strength is often poor.

Tapering of PCF may be used to provide low loss transition coupling from PCF to standard optical fibers (see e.g. WO00049435 or EP01199582). However, tapering is time-consuming and laborious work involving manufacturing of tapered optical fiber regions.

U.S. 2002/0114574-A1 discloses a heating and stretching technique for partially or fully collapsing a microstructured optical fiber in a tapered form, or in a non-tapered form keeping the overall diameter about the same, and providing a resultant optical fiber exhibiting mode contraction or mode expansion, respectively. A microstructured fiber with a single cladding region (apart from an over-cladding) with a single background material is disclosed.

WO04049025 discloses an optical fiber comprising holes or voids, where the holes are partially collapsed along the length It is an object of the present invention to provide an improved method of coupling a photonic crystal fiber to an optical component, in particular to an optical fiber such as a photonic crystal fiber, a non-microstructured optical fiber, or another optical component.

One object is to devise improved photonic crystal fiber designs for controlling the mode profile at the end of the fiber, such as to control a mode expansion at the end of the fiber.

It is an object of the present invention to provide PCFs that can be spliced with low loss and/or high strength to other optical fibers, such as standard optical fibers. Especially, it is an object to provide small core PCFs that can be spliced with low loss and/or high strength to standard optical fibers.

It is an object of the present invention to provide low-loss and/or high strength splices or splicings between PCF and standard non-microstructured optical fiber.

It is an object of the present invention to provide methods for making a low-loss and/or high strength splice between PCF and standard non-microstructured optical fibers.

It is an object of the present invention to provide use of PCFs with improved splice properties and splicings incorporating such PCFs.

One object of the present invention is to provide an optical fiber comprising at least a first end with an first end facet, the optical fiber comprising a core region capable of guiding light at a first wavelength λ; and a microstructured cladding region surrounding said core region. The cladding region comprises an inner cladding region and an outer cladding region. The inner cladding region comprises inner cladding features arranged in an inner cladding background material having a refractive index $n_1$, said inner cladding features comprising thermally collapsible holes or voids. The outer cladding region comprising outer cladding features arranged in an outer cladding background material, said outer cladding features comprising solid material with refractive index $n_2$, wherein $n_2$ is lower than $n_1$.

One object of the invention is to provide a method for coupling an optical fiber for transmission of light in its longitudinal direction to an optical component, the method comprises providing the optical fiber having a first fiber facet at a first fiber end. The optical fiber comprising a core region capable of guiding light as a first wavelength λ and a microstructured cladding region surrounding said core region. Said cladding region comprises an inner cladding region and an outer cladding region. The inner cladding region comprising inner cladding features arranged in an inner cladding background material having a refractive index $n_1$, where said inner cladding features comprises thermally collapsible holes or voids. The outer cladding region comprises outer cladding features arranged in an outer cladding background material, said outer cladding features comprising solid material with refractive index $n_2$, wherein $n_2$ is lower than $n_1$. The method further comprises collapsing at least a part of said first thermally collapsible holes or voids of said first inner cladding features by heating said first end of said optical fiber; and coupling said collapsed optical fiber end to the optical component. The collapse of said voids or holes of said inner cladding features provides an effective refractive index in at least a section of said inner cladding region, which is larger than the effective refractive index of the outer cladding region.

One object of the invention is to provide a method for splicing optical fibers, the method comprising:
(a) providing a first optical fiber according to the invention, the optical fiber having said first end;
(b) providing a second optical fiber having an end;
(c) aligning said ends of said first and second optical fibers relative to each other at a predetermined mutual distance; and
(d) subjecting a to-be-heated section of each of said optical fibers including said ends of said first and second optical fibers to a controlled heat treatment, thereby collapsing said voids or holes of said inner cladding features of said spliceable optical fiber or fibers over at least a part of said to-be-heated sections.

One object of the invention is to provide a preform for producing an optical fiber according to the invention, the preform comprising longitudinal preform elements comprising:
(a) at least one core element comprising a material with refractive index $n_{core}$;
(b) inner cladding elements comprising a tubular element of a material with refractive index $n_1$, said tubular element being capable of forming a collapsible hole or void in the spliceable optical fiber; and
(c) outer cladding elements comprising a tubular or a rod element of a solid material with refractive index $n_2$, said tubular or rod element being capable of forming a non-collapsible low index feature in the spliceable optical fiber;
where said elements are arranged such that an optical fiber according to the invention having collapsible inner cladding holes or voids can be produced from the preform.

In one embodiment of the invention, a method of modifying a spliceable optical fiber is provided, the method comprising:
(a) providing a length of an optical fiber according to the invention, the optical fiber having a first end; and
(b) subjecting a section of said length of said spliceable optical fiber to a controlled heat treatment, so that said collapsible inner cladding voids or holes of said optical fiber are collapsed over at least a part of said heat-treated section.

All voids or holes in said spliceable optical fiber are collapsed and/or sealed during the heat treatment of (b). The method may further comprise (c) cleaving said modified optical fiber in said part of said to-be-heated section where said collapsible inner cladding voids or holes have been collapsed thereby providing two separate lengths of optical fiber each having a heat-treated end wherein said collapsible inner cladding voids or holes have been collapsed.

In one embodiment, said part of said to-be-heated section includes said end of said spliceable optical fiber.

In one embodiment, the method further comprises (d) providing said heat-treated end with a well defined end facet, e.g. by polishing.

In one embodiment, said heat-treated end of said fiber and said well defined end facet of (d) are adapted to form part of an optical connector.

Further objects appear from the description elsewhere.

In one embodiment, said optical component is a second optical fiber, an optical connector, or a combination thereof whereby a low loss fiber to fiber connector or a low loss connector for fixating the fiber end to other optical components, e.g. lasers, detectors, etc. can be obtained.

In one embodiment, said second optical fiber is a photonic crystal, or a non-microstructured optical fiber whereby a low loss coupling of an optical fiber and said optical fiber (e.g. in the form of a spliced coupling or connectorized coupling) can be obtained.

In the context of the present invention, the phrase "background material" of a region may refer to a single material, which constitutes the majority of the region as measured by the fraction of the cross sectional area of the solid part of the region that is made of by this particular material, such as at least 50% of the area, such as at least 60% of the area, such as at least 70% of the area, such as at least 80% of the area, such as at least 90% of the area, such as at least 95% of the area. The background material may also comprise two materials with similar refractive indices, such as refractive indices which differs by less than about 10%, such as less than about 5%, such as less than about 2%, such as less than about 1%, such as less than about 0.5%, such as less than about 0.1%, such as less than about 0.05%.

In the context of the present invention, the phrase "end facet" may refer to the free end of an optical fiber or it may be part of a fiber splice where said end facet is arranged in the splice joint.

In one embodiment, the inner cladding features differ from the outer cladding features at least in cross sectional dimension and/or material composition.

The cross-sectional dimension may be a diameter, such as for circular feature in e.g. the inner cladding region. For a non-circular cross-section of a feature, the cross-sectional dimension may refer to diameter of the circle circumscribing a cross-section of the feature.

In one embodiment, the outer cladding features comprise down-doped silica, such as F-doped silica.

The outer cladding features may be substantially solid. In the context of the present invention the phrase "a substantially solid feature" may refer to the situation where the feature in cross section comprises at least about 60% solid material, such as at least about 70% solid material, such as at least about 80% solid material, such as at least about 90% solid material, such as at least about 95% solid material, such as at least about 98% solid material, such as being completely solid.

In one embodiment, said thermally collapsible holes or voids of at least a part of said first inner cladding features are at least partially collapsed at said first end, such as over a collapsed length from said first end facet.

The collapsing of said thermally collapsible holes or voids may be substantially abrupt whereby expansion over a short length of the fiber can be obtained or it may be gradual towards the first end facet, whereby an adiabatic expansion of the mode field of a guided mode can be obtained A substantially abrupt collapse may occur over less than about 50 µm, such as over less than about 40 µm, over less than about 25 µm, over less than about 10 µm, over less than about 5 µm. The abrupt collapse may also occur over a length which is shorter than the cross sectional dimension of the optical fiber, such as one half of the cross sectional dimension, such as on fifth of the cross sectional dimension, such as one tenth of the cross sectional dimension.

In one embodiment, said thermally collapsible holes or voids are wholly collapsed at said first end facet, such as along said collapsed length from said first end facet.

When holes or voids of inner cladding features are at least partially collapsed in a section of the inner cladding region, the effective refractive index of that section is raised and it may become comparable to the effective refractive index of the core region. When such a section is arranged close to the core region and further is surrounded by sections with non-collapsed inner cladding features and/or by an outer cladding region with low-index outer cladding features, the core region and the collapsed part of the inner cladding region may appear as one enlarged guiding region, i.e. in cross section the enlarged guiding region comprises the core region and a part of said inner cladding region wherein said inner cladding features are collapsed.

In one embodiment, said heating is being adapted so that a guided mode at said at least one end of the optical fiber is confined by an effective index profile determined by background materials of the core and the inner cladding and the outer cladding, which may comprise low-index solid features; said index profile providing said an expanded guiding region at the fiber end, and the outer cladding providing the actual cladding of said at least one fiber end whereby it is obtained that light is expanded to an increased size suitable for efficient/low loss coupling of e.g. splicing and connectorization.

Light propagating through the optical fiber towards the first end may in this situation spread out from the core region to at least partially fill the enlarged guiding region at the first fiber facet. Thereby the mode field diameter of the guided core mode may be enlarged in the collapsed part of the fiber. This may allow light guided in the fiber to be expanded over the length of optical fiber, where the holes or voids of the inner cladding features are collapsed. Hence a coupling to an optical component having a mode field diameter substantially matching the mode field diameter of the enlarged core region is possible with a low loss.

Control over the extent of the hole or void collapse provides a further control of the index profile at the first fiber end in addition to e.g. the refractive indices of the materials of the inner and outer cladding regions.

In one embodiment, light may be coupled with low loss from a relatively small core region of one optical fiber (core having a cross-sectional dimension $d_{c1}$) to a relatively large core region of another optical fiber (core having a cross-sectional dimension $d_{c2}$ that is larger than $d_{c1}$). This low loss coupling may be realized by using an optical fiber according to the present invention as the small-core optical fiber and expanding the core mode at the fiber end arranged in relation to the optical fiber with the relatively larger core. The mode expansion may then be realized by collapsing the inner cladding features in at least a part of the inner cladding region. When the mode field diameter of the enlarged guiding region of the small-core optical fiber and the optical fiber with the relatively larger core becomes sufficiently identical, such as substantially identical, low loss coupling may be realized.

Generally a coupling can be accomplished in any suitable way which allows a low loss transmission of light to/from one optical component to another. Such methods include fusion, free space optics, index matching glue, etc.

In one embodiment, said coupling comprises fusing of said at least one collapsed optical fiber end and said optical component whereby the optical fiber can be coupled to the optical component with a low loss and large mechanical strength.

Collapse of the inner cladding features (and optionally of outer cladding features comprising voids or holes, such as second type of outer cladding features) may occur before or after the optical fiber is coupled to said optical component. That is the optical fiber end may be coupled to the optical component before said collapsible holes or voids are collapsed or it may be coupled to the optical component after said collapsible holes or voids are collapsed. The collapse may also occur while the optical fiber end is coupled to the optical component, such that the heating provided to couple the two together also provides the collapse of the holes or voids.

In one embodiment, the core cross sectional dimension is $d_{c1}$ in an end where the voids of the inner cladding features are not collapsed by e.g. heating the fiber.

The outer cladding features may have many shapes and sizes, such as known from photonic crystal fiber technology, including so-called leaky channel designs.

In one embodiment, the inner cladding comprises at least two types of features, such as a plurality of a first type of inner cladding feature and a plurality of a second type of inner cladding feature. The first type of inner cladding feature may comprise a collapsible void or hole with cross-sectional dimension $d_{inner,1}$, and the second type of inner cladding feature may comprise a collapsible void or hole with cross-sectional dimension $d_{inner,2}$. For circular holes or voids, the cross-sectional dimension is typically a diameter. For a non-circular cross-section of a void or hole, the cross-sectional dimension may refer to the circle circumscribing a cross-section of the void or hole. With inner cladding features comprising voids of different cross sectional dimension, the result of using a heat treatment process, may be that the lengths over which inner cladding features of the different types collapse may be controlled individually.

In one embodiment, a majority of said first type of inner cladding feature are arranged closer to the core region than a majority of said second type of inner cladding feature.

In one embodiment $d_{inner,1}$ is smaller than $d_{inner,2}$.

The plurality of said first type of inner cladding feature may be collapsed over a longer section from the first end facet than the plurality of said second type of inner cladding feature, such that the enlarged guiding region comprises a part of said inner cladding region, wherein the first type of inner cladding features are collapsed. A guided mode propagating in the core region towards the first fiber end may hence be expanded, such that there is an increase in the mode field diameter, at the position where the features of first type are collapsed. The collapse of the first type of inner cladding feature may be gradual such that light propagating in said core region is adiabatically coupled to said enlarged guiding region, such that a coupling loss of light at the transition from the core region to the enlarged guiding region is kept at a minimum, whereby losses of light travelling at said first wavelength along the optical fiber to the collapsed fiber end may be low or negligible. The coupling loss may be less than about 2 dB, such as less than about 1 dB, such as less than about 0.5 dB, such as less than about 0.3 dB, such as less than about 0.2 dB, such as less than about 0.1 dB, such as less than about 0.05 dB, or smaller. The adiabatic transition from light being guided in the core region to being guided in the enlarged guiding region may be realized by adjustment of the heat treatment process for the collapse of inner cladding features and/or optimization of fiber design parameters, such as hole dimensions and positions, relative position of features of different types.

Collapsing of the thermally collapsible holes or voids can be accomplished in a number of different ways. Common of these ways are that heat is used to soften the background material(s) whereby the thermally collapsible holes or voids contract. Surface tension, evacuation of fluids by pressure control and/or other means may assist in the contraction.

Generally heating can be accomplished in any suitable way whereby energy is conveyed to the inner cladding region such as thermal, inductive, radiative absorption or other means.

In one embodiment, said heating is provided by a fusion splicer whereby commercially available equipment suitable for controlling the heat treatment can be used.

Generally an optical component in the present context includes any component which propagates light (e.g. an optical fiber, such as a photonic crystal fiber or a non-microstructured fiber); any component which supplies light (e.g. a light source such as a laser); any component which receives light (e.g. a detector); and/or any component which can be used for connecting one optical component to another such as an optical connector.

In one embodiment, said second optical fiber is a spliceable optical fiber according to the invention.

In one embodiment, said second optical fiber is a standard fiber, such as a standard single mode fiber, such as an SMF-128 fiber.

In one embodiment, said heat source is a fusion splicer such as a Vytran FFS2000 fusion splicer.

In one embodiment, said optical fiber is a non-linear optical fiber.

In one embodiment, a guided mode of the core region of the optical fiber has a mode field diameter of less than about 5 µm at least at one position along said optical fiber and a mode field diameter of more than about 5 µm at said first end facet, such more than about 7 µm, such as more than about 9 µm, such as more than about 12 µm, such as more than about 15 µm. Said mode field diameter may be less than about 1000 µm at said first end facet, such as less than less than about 500 µm, such as less than less than about 250 µm.

In one embodiment, said optical fiber has at least one position, position 1, along its length, where a guided mode at said first wavelength, $\lambda$, is confined to the core region by the presence of inner cladding features, and $\lambda$ is in the range from 0.4 µm to 2.0 µm.

In one embodiment, the core region has at least at one position along said optical fiber a largest cross sectional dimension, $r_{PCF}$, being in the range of 0.8 µm to 5.0 µm. In one embodiment, this dimension is smaller than 3.0 µm, for example in a case where the optical fiber is used for generation of nonlinear effects.

With the collapse of the inner cladding features at the first fiber end, this cross sectional dimension is expanded and the optical fiber may couple light with low loss to other optical components in spite of the small size of the core region.

In one embodiment of the invention, the inner cladding region has a cross sectional dimension, $r_{solid}$, which is in the range of 3.0 µm to 15.0 µm at least at one position along said optical fiber. When the inner cladding features are collapsed, an enlarged guiding region covering the core region and at least a part of said inner cladding region is formed. An optical fiber according to the present invention having a small core may hence couple light to other optical components having a spot size/mode field diameter around 3.0-15.0 µm with low loss. In practice a collapse of the inner cladding features may result in a reduction of the cross sectional dimension of the enlarged guiding region. In one embodiment $r_{solid}$ is in the range of 2.0 µm to 12.0 µm at the first fiber end. In one embodiment, the cross sectional dimension of the enlarged guiding region at said first fiber end is substantially identical to $r_{solid}$. The largest cross sectional dimension of the enlarged guiding region at said first fiber end may be in the range of about 2.0 µm to about 12.0 µm.

In one embodiment, the formation of collapsible holes or voids in the inner cladding of the produced optical fiber is obtained by selecting inner cladding preform elements with added softeners and selecting outer cladding preform elements with solid material so that application of heat to the produced spliceable optical fiber ensures that the inner cladding holes and voids collapse.

In one embodiment, said core region comprises material with a refractive index $n_{core}$, and $n_{core}$ is larger than $n_1$. This allows for example to design an optical fiber with a high nonlinear coefficient, to tailor the dispersion properties of the optical fiber, and/or to tailor the cut-off properties of the optical fiber.

The inner and outer cladding features may be adapted for special dispersion and nonlinear properties, such as desired for e.g. super continuum generation, such as for example for blue, violet, UV, or for infrared light generation.

In one embodiment, said core region comprises material with a refractive index $n_{core}$, and $n_{core}$ is smaller than $n_1$. This allows for example to tailor the dispersion properties of the optical fiber, and/or to tailor the cut-off properties of the optical fiber.

In one embodiment, said core region comprises material with a refractive index $n_{core}$, and $n_{core}$ is smaller, equal to, or larger than $n_2$.

In one embodiment, $n_1$ is larger than $n_2$.

In one embodiment, the refractive index of said outer cladding background material is similar to $n_1$.

In one embodiment, the refractive index of said outer cladding background material is different from $n_1$.

In one embodiment, a preform according to the invention is provided wherein $n_{core}$ is higher than $n_1$.

In one embodiment, a preform according to the invention is provided wherein $n_{core}$ is substantially equal to $n_1$.

In one embodiment, a preform according to the invention is provided wherein $n_{core}$ is lower than $n_1$.

In one embodiment, a preform according to the invention is provided wherein said core element is a pure silica rod.

In one embodiment, a preform according to the invention is provided wherein said core element is a rod comprising doped silica, such as Ge, Al, F, B, Er, or Yb doped silica, or combinations of these.

In one embodiment, said core of said optical fiber comprises doped silica, such as Ge, Al, F, B, Er, or Yb doped silica, or combinations of these.

In one embodiment, a preform according to the invention is provided wherein said inner cladding elements are pure silica tubes.

In one embodiment, a preform according to the invention is provided wherein said inner cladding elements are tubes comprising doped silica, such as Ge, Al, F, B, Er, or Yb doped silica, or combinations of these.

In one embodiment, said inner cladding feature of said optical fiber comprises doped silica, such as Ge, Al, F, B, Er, or Yb doped silica, or combinations of these.

In one embodiment, a preform according to the invention is provided wherein said outer cladding elements are rods comprising an outer pure silica shell and an inner doped core, such as for example a F-doped core, or for example a Ge doped core.

In one embodiment, a preform according to the invention is provided wherein said preform comprises an overcladding tube.

In one embodiment, a preform according to the invention is provided wherein said preform comprises buffer elements, such as rods and/or tubes with a smaller cross-sectional size than the outer cladding elements.

In one embodiment, a preform according to the invention is provided wherein said preform comprises a given number of inner cladding elements, and said number is in the range from 6 to 18, such as equal to 6.

At least some of the objects of the present invention are fulfilled by providing a method of producing a spliceable optical fiber according to the invention, the method comprising drawing an optical fiber from a preform according to the invention.

At least some of the objects of the present invention are fulfilled by providing a heat-treated optical fiber comprising an optical fiber according to the invention, or a spliceable optical fiber obtainable by a method according to the invention, prepared by a heat-treatment of at least one end or a section of the spliceable optical fiber.

At least some of these objects are fulfilled by providing an article comprising an optical fiber according to the invention, or an optical fiber and optical component coupling obtainable by a method according to the invention, wherein said article is a non-linear fiber component, and/or a dispersion compensating fiber component, and/or an active optical fiber component.

At least some of these objects are fulfilled by providing an article comprising an optical fiber according to the invention, or an optical fiber and optical component coupling obtainable by a method according to the invention, wherein an outer diameter of the optical fiber is substantially uniform along the axial direction.

In one embodiment, said optical fiber has at least one end being solid, such as a solid end being obtained by collapsing any holes or voids in the end of the fiber. This allows a splicing to the solid end of the optical fiber where a high temperature is applied in order to produce a high-strength splicing.

In one embodiment, the outer cladding region comprises a second type of outer cladding feature comprising a collapsible hole or void. The second type of outer cladding features may be arranged such that they substantially surround the outer cladding features comprising solid material with refractive index $n_2$.

In the present context there is made a distinction between the term "refractive index" and the term "effective refractive index".

The refractive index is the conventional refractive index of a homogeneous material. The effective refractive index is the index that light at a given wavelength, $\lambda$, experiences when propagating through a given material that may be complex (meaning that the material complex comprises two or more sub-materials, typically a background material of one refractive index and one or more type of features of different refractive index/indices). For homogeneous materials, the refractive and the effective refractive index will naturally be similar. For complex materials (such as microstructures), the effective refractive index is further discussed below. The term refractive index is also used to describe the refractive index of a sub-material in a complex material (such as the refractive index of a feature in a microstructured material). The effective refractive index is generally not identical to the "weighted refractive index" or "geometrical index". These may be determined directly from geometric calculations for a given complex material when the refractive indices of the sub-materials are known.

For some applications of the optical fibers of the present invention, the most important optical wavelengths are in the visible to near-infrared regime (wavelengths from approximately 400 nm to 2 µm). In this wavelength range most relevant materials for fiber production (e.g. silica) may be considered mainly wavelength independent, or at least not strongly wavelength dependent. However, for non-homogeneous materials, such as fibers with voids or air holes, the effective refractive index may be very dependent on the morphology of the material. Furthermore, the effective refractive index of such a fiber may be strongly wavelength dependent. The procedure of determining the effective refractive index at a given wavelength of a given fiber structure having voids or holes is well-known to those skilled in the art (see e.g. Jouannopoulos et al, "Photonic Crystals", Princeton University Press, 1995 or Broeng et al, Optical Fiber Technology, Vol. 5, pp. 305-330, 1999).

As appreciated within the field of microstructured fibers, the term "air holes" of the cladding and/or in the core may include holes or voids comprising a vacuum, gas or liquid, said holes or voids being fully or partly filled with a liquid or a gas after production of the microstructured optical fiber.

Within the present context it is intended that the term "spliceable optical fiber" is interpreted broadly to include the ability of an optical fiber to be spliced to another optical fiber or to be connected to another optical component, e.g. a connector, thereby ensuring coupling of the transmitted light to said other optical fiber or said other optical component with a reduced loss of light. It is intended that the term "an end of an optical fiber" designates a longitudinal section of the optical fiber at an end thereof, including the end face thereof.

By thermally collapsible holes or voids is in the present context understood holes or voids that comprise a gas or vacuum or a liquid which can be removed e.g. by evacuation, and are surrounded by a material that may soften when heated.

In one embodiment, the optical fiber is used as an intermediate fiber, i.e. a fiber connecting tow or more fibers. For example, for fiber-to-fiber splicing between dissimilar fibers, an optical fiber according to an embodiment of the present invention can be used as an intermediate fiber. The dissimilar fibers are typically different in one or more parameter, such as core diameters, core doping, index profile, etc. This allows, for example, straight intermediate fibers (none-tapered intermediate fiber and/or none-tapered dissimilar fibers). It is an advantage to use intermediate fibers with comparable or identical outer diameter as one or more of the dissimilar fibers, i.e. to match outer diameter of one or more fibers. Such matching of outer diameters increases mechanical strengths.

It should be noticed that tapering provides additional means for optimizing fibers according to preferred embodiments of the present invention. Hence, tapered optical fibers or sections of optical fibers according to the present invention are also covered in preferred embodiments of the present invention.

It should also be noticed that means for controlling the collapse or partly collapse of holes or voids using pressurization is also within the scope of the present invention. Also pressurization of selected holes or voids is also within the scope of the present invention.

It is to be understood that the following detailed description is merely exemplary of the invention, and is intended to provide an overview or framework for understanding the nature and character of the invention as it is claimed. The accompanying figures are included to provide further understanding of the invention, and are incorporated in and constitute a part of the disclosure of the invention. The invention is not limited to the described examples. The figures illustrate various features and embodiments of the invention and together with the description serve to explain the principles and operation of the invention.

Other objects, features and advantages of the present invention will be more readily apparent from the detailed description of the preferred embodiments set forth below, taken in conjunction with the accompanying drawings.

In the present examples the feature in the form of holes and voids are shown in cross sectional views as circles wherein a diameter (e.g. $d_1$) is generally used to indicate the size or maximum inner dimension of the feature. It is intended that the holes or voids may exhibit any form in which case the relevant dimension for its characterization is its maximum, inner dimension.

BRIEF DESCRIPTION OF THE DRAWINGS

The invention will be explained more fully below in connection with preferred embodiments and with reference to the drawings in which.

The FIGS. are schematic and may be simplified for clarity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1A:
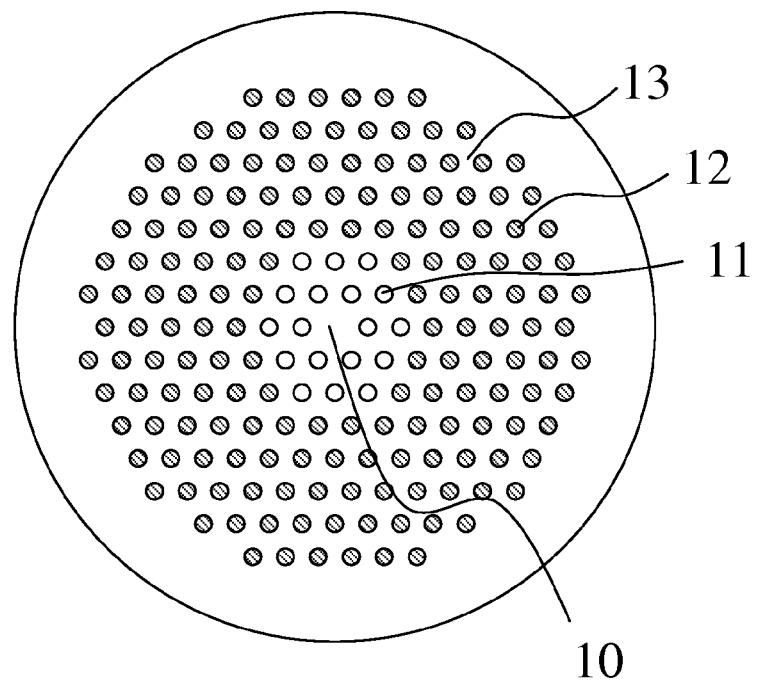
FIG. 1a and 1b shows schematic example of embodiments according to the present invention.
Figure 1B:
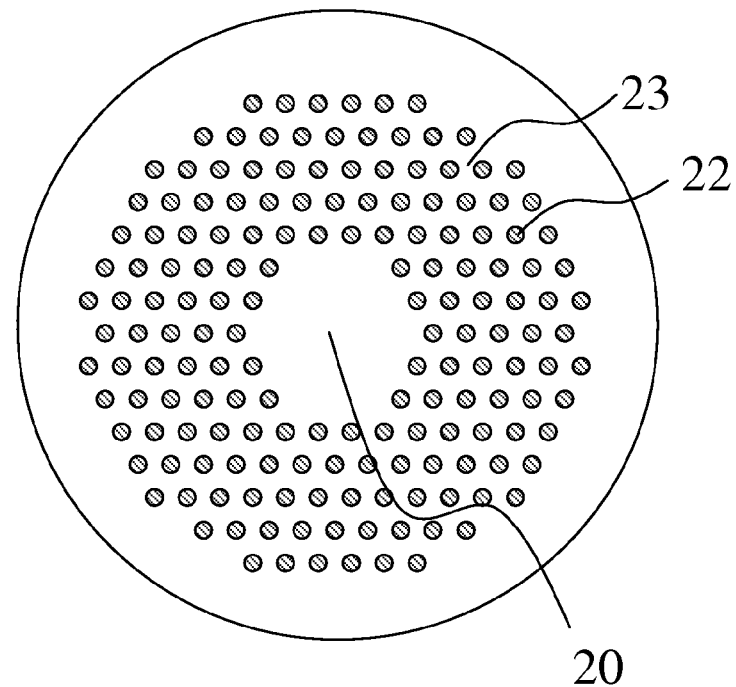

FIG. 1a shows one section of the fiber comprising a core 10, inner collapsible cladding features 11 (typically holes or voids), outer solid (non-collapsible features 12) and a background material 12. FIG. 1b shows an end of the fiber (or alternatively a section along the fiber length), where inner cladding are collapsed whereby an enlarged core region is provided.

Figure 2A:
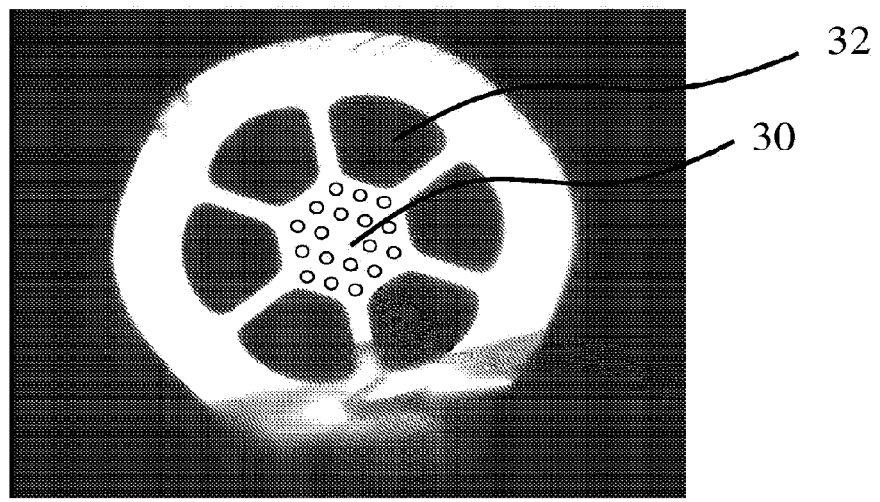
FIGS. 2 to 4 shows schematic examples of embodiments of the present invention.
Figure 2B:
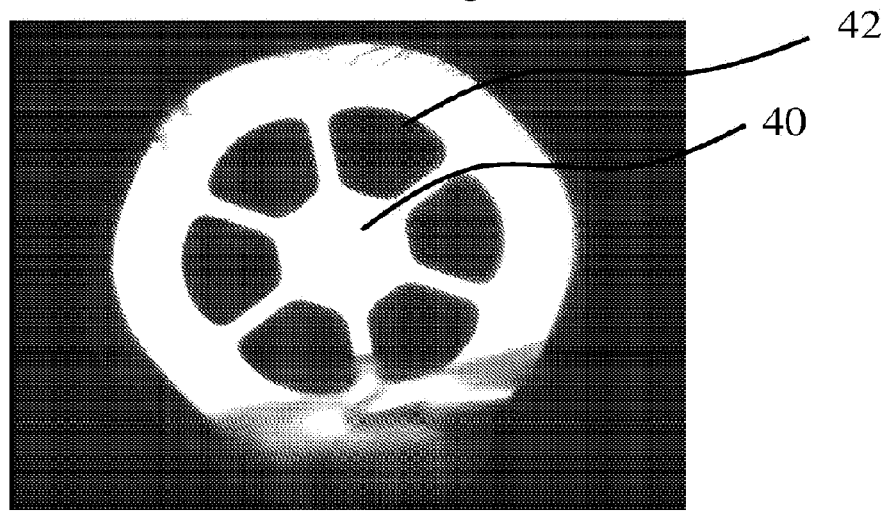
Figure 3:
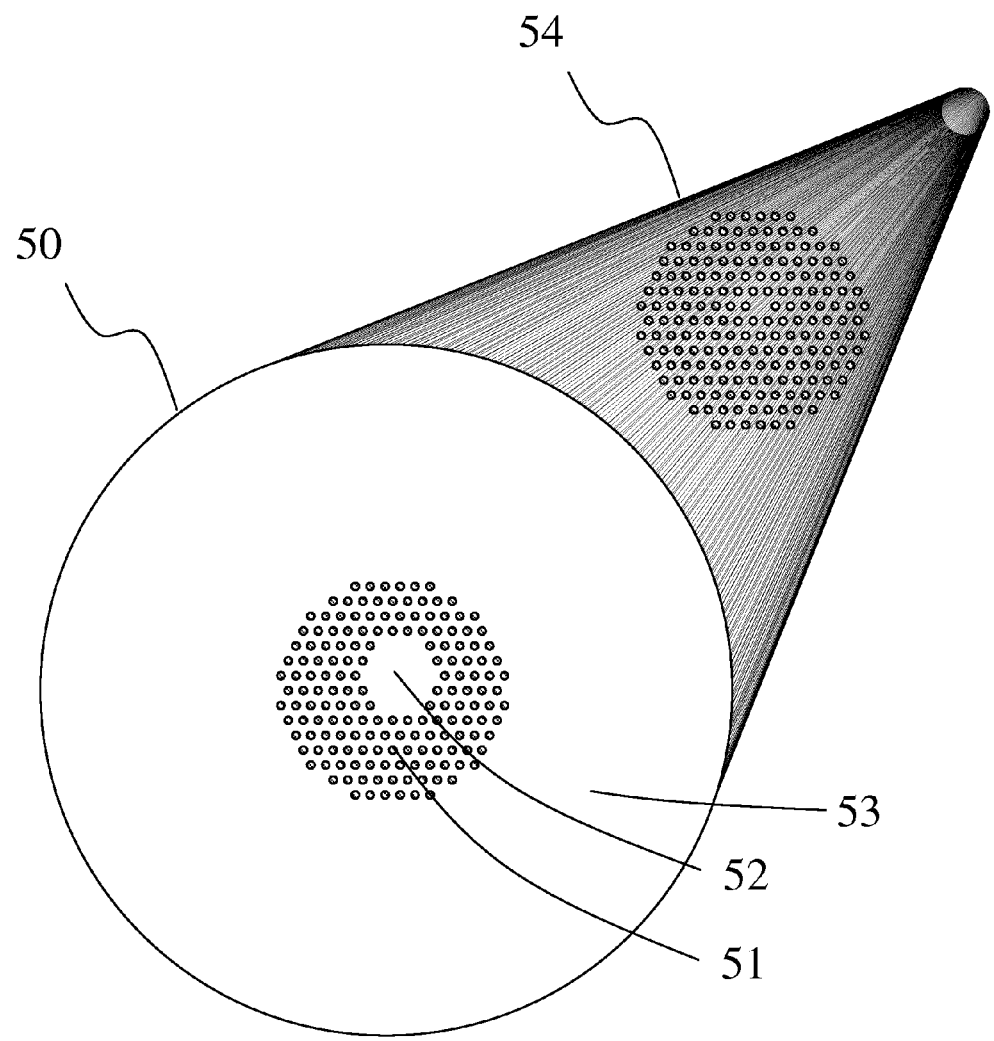
Figure 4A:
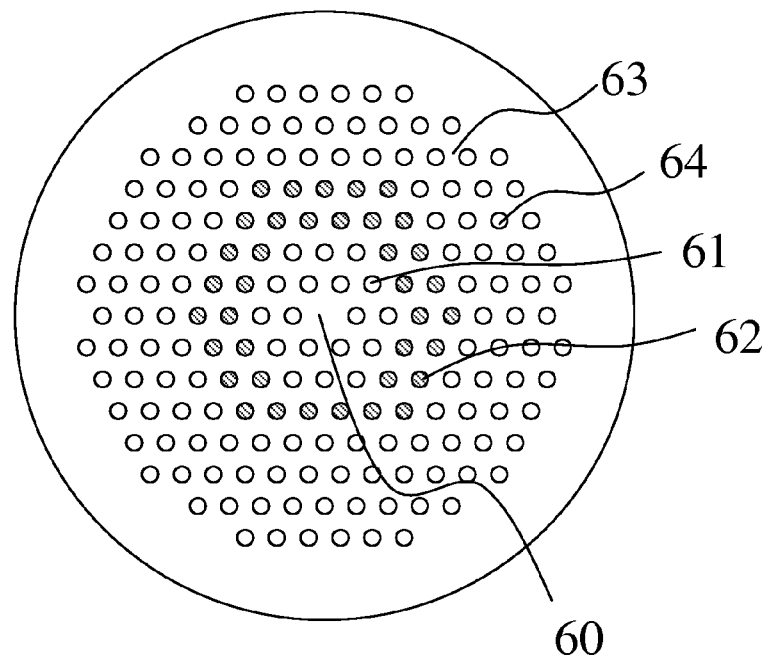
Figure 4B:
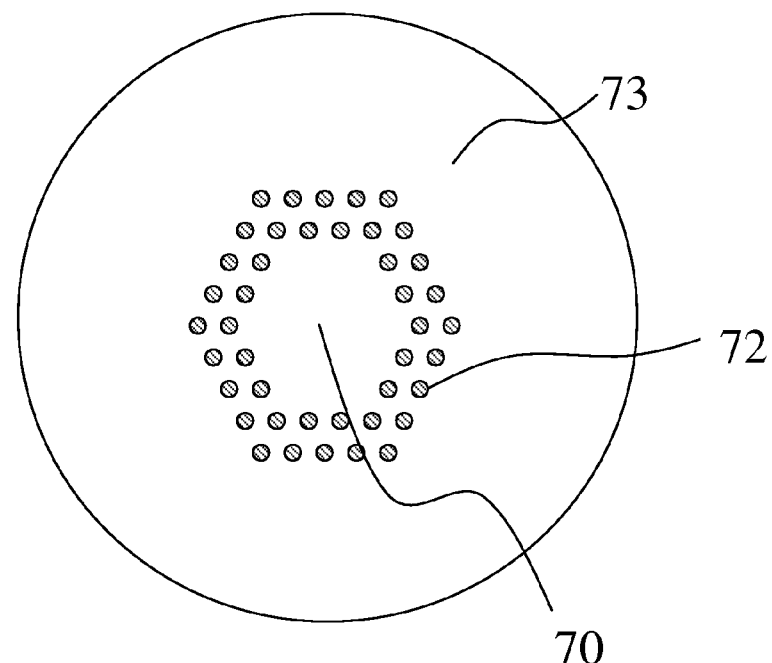
Figure 5:
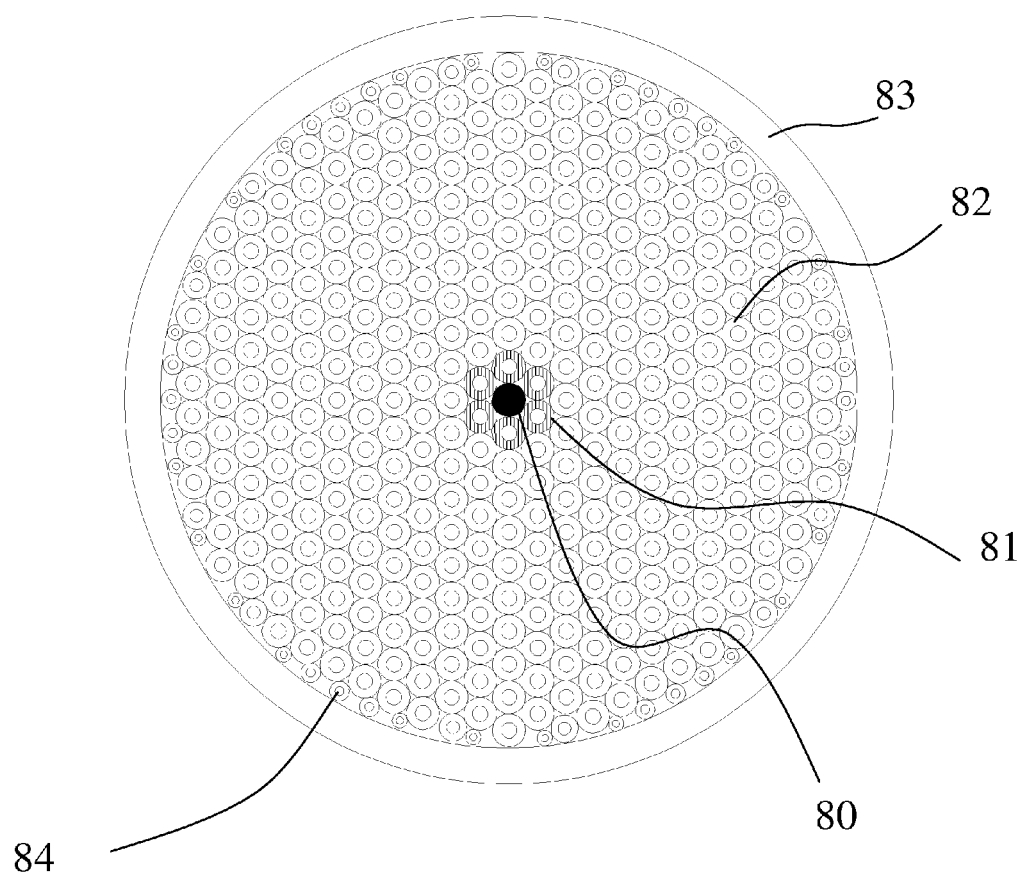
FIG. 5 shows schematic example of a preform.

FIGS. 2 to 4 shows further schematic examples of embodiments of the present invention. Collapsible features 64 may also be placed outside non-collapsible features 62, for example to improvement fiber performance with respect to losses, dispersions, nonlinearity and/or other performance. An example of such a fiber design is seen in FIG. 4a, where collapsible second type of outer cladding features 64 are arranged outside the non-collapsible features 62 of the outer cladding region. When the optical fiber is heated, the collapsible features 61 and 64, collapse in the heated section resulting such that the solid outer cladding features 62, 72 are surrounded by a solid region of material 73.

Figure 6:
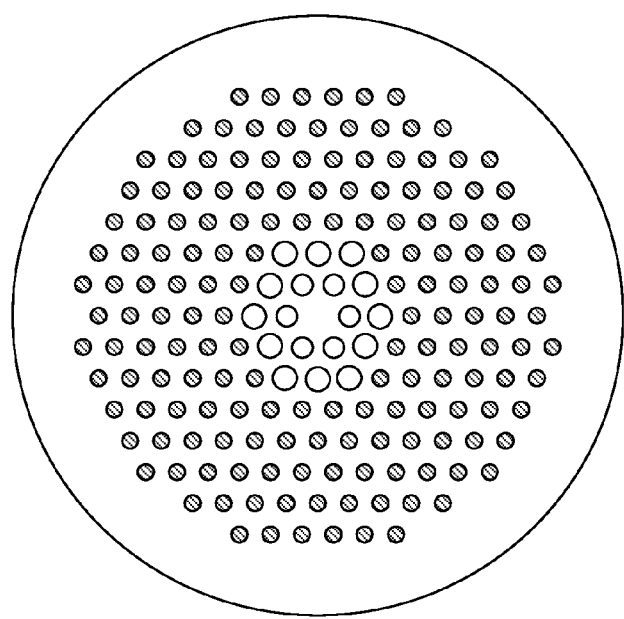
FIG. 6 shows a schematic example of an embodiment of the present invention.

FIG. 6 shows another schematic example of an embodiment of the present invention, wherein the inner cladding comprises first and second type of features. The first type of feature comprises a void or hole with cross-sectional dimension $d_{inner,1}$ and the second type of feature comprises a void or hole with cross-sectional dimension $d_{inner,2}$, where $d_{inner,1}$ is smaller than $d_{inner,2}$. Since smaller holes collapse faster and easier, this ensures that the inner-most ring of inner cladding features collapse before the $2^{nd}$ ring. With a collapse of the inner cladding features towards a fiber end, where the holes or voids are collapsed to expand the MFD, this expansion may happen in steps when inner cladding features with different hole sizes are used. A step-wise expansion of the MDF from that seen in the core region of an uncollapsed section of the optical fiber to that seen in the enlarged guiding region of the collapsed end, helps to reduce transition losses between the collapsed/uncollapsed region.

Figure 7:
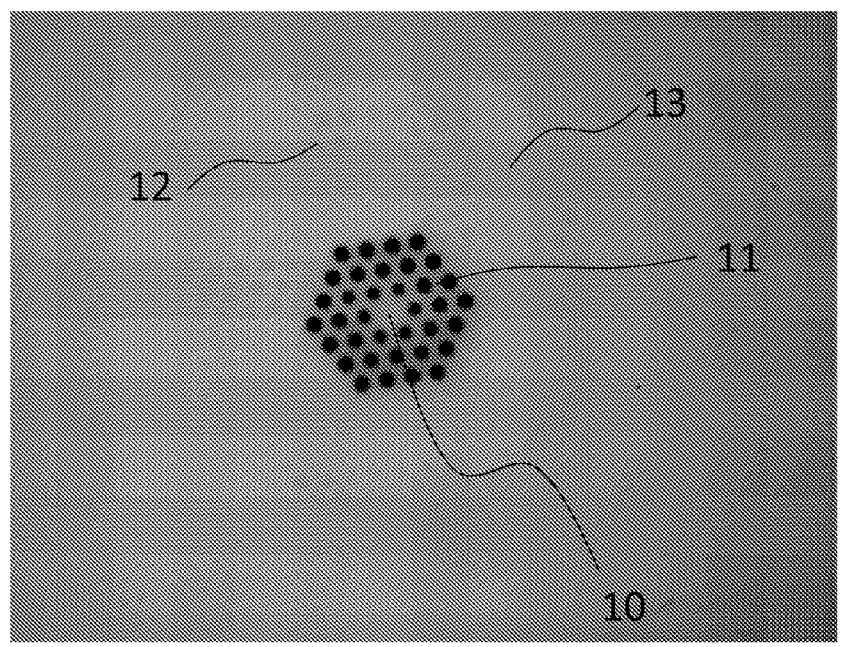
FIG. 7 shows a picture of an optical fiber according to the present invention.
Figure 8:
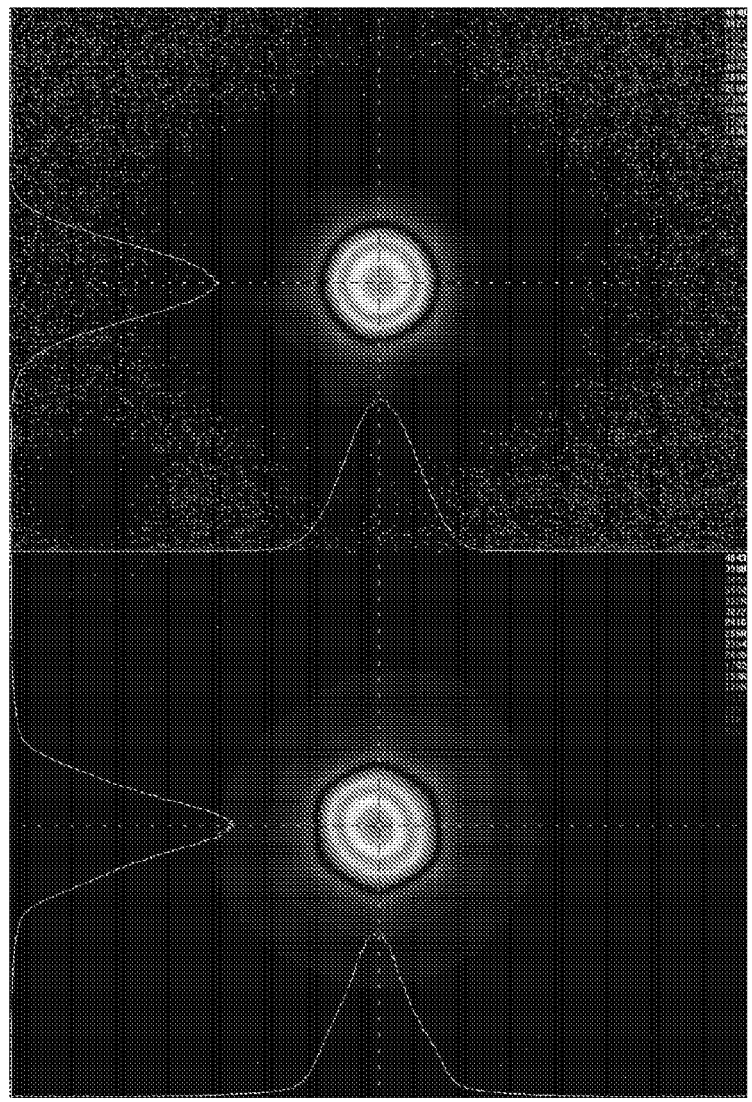
FIG. 8 shows measured mode profiles from the fiber depicted in FIG. 7.

FIGS. 7 and 8 show a picture and mode profiles for a realized optical fiber according to the present invention. The core region 10 is surrounded by an inner cladding region with inner cladding features 11. The outer cladding region comprises a number of solid outer cladding features 12. FIG. 8 shows the mode profiles of a fiber end wherein the inner cladding features are not collapsed (upper half of figure) and wherein they are collapsed (lower half of figure). In the upper part the average mode field diameter is 3.4 µm while it in the fiber end with the collapsed inner cladding features is increased to 14.1 µm, for light propagating at a first wavelength of 1064 nm.

While the invention has been particularly shown and described with reference to particular embodiments, it will be understood by those skilled in the art that various changes in form and details may be made therein without departing from the spirit and scope of the invention, and it is intended that such changes come within the scope of the following claims.

The invention claimed is:

1. An optical fiber comprising at least a first end with an first end facet, said optical fiber comprising:
   (a) a core region capable of guiding light at a first wavelength λ; and
   (b) a microstructured cladding region surrounding said core region, said cladding region comprising:
      (b1) an inner cladding region comprising inner cladding features arranged in an inner cladding background material having a refractive index $n_1$, said inner cladding features comprising thermally collapsible holes or voids; and
      (b2) an outer cladding region comprising outer cladding features arranged in an outer cladding background material, said outer cladding background material having a refractive index $n_1$ and said outer cladding features are substantially solid and comprise solid down doped silica with a refractive index $n_2$, wherein $n_2$ is lower than $n_1$, and wherein said outer cladding features have a pure silica outer shell;
   wherein said thermally collapsible holes or voids of at least a part of said first inner cladding features are at least partially collapsed at said first end over a collapsed length from said first end facet.

2. The optical fiber according to claim 1, wherein said inner cladding features differ from said outer cladding features at least in material composition.

3. The optical fiber according to claim 1, wherein said collapsing of said thermally collapsible holes or voids is gradual towards the first end facet.

4. The optical fiber according to claim 1, wherein said collapsing of said thermally collapsible holes or voids is substantially abrupt.

5. The optical fiber according to claim 1, wherein said thermally collapsible holes or voids are wholly collapsed at said first end facet.

6. The optical fiber according to claim 5, wherein a refractive index $n_{core}$ of the core region is larger than $n_1$.

7. The optical fiber according to claim 1, wherein the collapse of said thermally collapsible holes is such that an enlarged guiding region is defined at the first end facet, said enlarged guiding region comprising the core region and a part of said inner cladding region wherein said inner cladding features are collapsed.

8. The optical fiber according to claim 7, wherein the largest cross sectional dimension of the enlarged guiding region at said first fiber end is in the range of 2.0µm to 12.0 µm.

9. The optical fiber according to claim 1, wherein said optical fiber is a non-linear optical fiber.

10. The optical fiber according to claim 1, wherein a guided mode of the core region of the optical fiber has a mode field diameter of less than 5 μm at least at one position along said optical fiber and a mode field diameter of more than 9 μm.

11. The optical fiber according to claim 1, wherein the core region at least at one position along said optical fiber has a largest cross sectional dimension, $r_{PCF}$, being in the range of 0.8 μm to 5.0 μm.

12. The optical fiber according to claim 1, wherein the inner cladding region at least at one position along said optical fiber has a largest cross sectional dimension, $r_{solid}$, being in the range of 3.0 μm to 15.0 μm.

13. The optical fiber according to claim 1, wherein a guided mode of the core region of the optical fiber has a mode field diameter of less than 5 μm at least at one position along said optical fiber and a mode field diameter of more than 12 μm.

14. The optical fiber according to claim 1, wherein said inner cladding features differ from said outer cladding features at least in cross sectional dimension.

15. The optical fiber according to claim 1, wherein the core region comprises material with a refractive index $n_{core}$, and $n_{core}$, is substantially equal to $n_1$.

16. The optical fiber according to claim 1, wherein the core is a pure silica.

17. The optical fiber according to claim 1, wherein the inner cladding background material is pure silica.

18. The optical fiber according to claim 1, wherein a refractive index $n_{core}$ of the core region is larger than $n_1$.

19. The optical fiber according to claim 1, wherein said inner cladding background material is identical to said outer cladding background material.

20. A method for coupling an optical fiber for transmission of light in its longitudinal direction to an optical component, the method comprises:
(A) providing the optical fiber having a first fiber facet at a first fiber end, said optical fiber comprising:
a core region capable of guiding light as a first wavelength λ; and
a microstructured cladding region surrounding said core region, said cladding region comprising:

(b1) an inner cladding region comprising inner cladding features arranged in an inner cladding background material having a refractive index $n_1$, said inner cladding features comprising thermally collapsible holes or voids, and
(b2) an outer cladding region comprising outer cladding features arranged in an outer cladding background material, said outer cladding background material having refractive index $n_1$, and said outer cladding features are substantially solid and comprise solid down doped silica with refractive index $n_2$, wherein $n_2$ is lower than $n_1$, and wherein said outer cladding features have a pure silica outer shell;
(B) collapsing at least a part of said thermally collapsible holes or voids of said first inner cladding features by heating said first end of said optical fiber; and
(C) coupling said collapsed optical fiber end to the optical component;
wherein the collapse of said voids or holes of said inner cladding features provide an effective refractive index in at least a section of said inner cladding region, which is larger than the effective refractive index of the outer cladding region.

21. A method according to claim 20, wherein said optical fiber end is coupled to the optical component before said collapsible holes or voids are collapsed.

22. A method according to claim 20, wherein said optical fiber end is coupled to the optical component while said collapsible holes or voids are collapsed.

23. A method according to claim 20, wherein said optical fiber end is coupled to the optical component after said collapsible holes or voids are collapsed.

24. The method according to claim 20, wherein a refractive index $n_{core}$ of the core region is larger than $n_1$.

25. The method according to claim 20, wherein said inner cladding background material is identical to said outer cladding background material.

26. The method according to claim 25, wherein a refractive index $n_{core}$ of the core region is larger than $n_1$.

* * * * *